United States Patent
Sugimoto et al.

(10) Patent No.: US 10,106,115 B2
(45) Date of Patent: Oct. 23, 2018

(54) POSITION DETECTION APPARATUS, POSITION DETECTION METHOD, AND POSITION DETECTION SYSTEM

(71) Applicant: DENSO CORPORATION, Kariya, Aichi-pref. (JP)

(72) Inventors: Yuji Sugimoto, Nishio (JP); Masakazu Ikeda, Nishio (JP); Kimiaki Tanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/749,790

(22) PCT Filed: Jul. 14, 2016

(86) PCT No.: PCT/JP2016/070761
§ 371 (c)(1),
(2) Date: Feb. 2, 2018

(87) PCT Pub. No.: WO2017/022438
PCT Pub. Date: Feb. 9, 2017

(65) Prior Publication Data
US 2018/0208140 A1 Jul. 26, 2018

(30) Foreign Application Priority Data
Aug. 5, 2015 (JP) ................................. 2015-155344

(51) Int. Cl.
*B60Q 1/26* (2006.01)
*B60R 21/013* (2006.01)
(Continued)

(52) U.S. Cl.
CPC ............ *B60R 21/013* (2013.01); *G01C 21/28* (2013.01); *G01S 19/07* (2013.01); *G01S 19/40* (2013.01);
(Continued)

(58) Field of Classification Search
CPC ................................. B60R 9/00; G08B 21/24
(Continued)

(56) References Cited

U.S. PATENT DOCUMENTS

| | | | |
|---|---|---|---|
| 2004/0066376 A1* | 4/2004 | Donath | ...................... B60R 1/00 345/169 |
| 2013/0223303 A1* | 8/2013 | Nakakuki | .............. G08G 1/094 370/310 |
| 2015/0291216 A1* | 10/2015 | Sato | ....................... B60W 50/14 701/23 |

FOREIGN PATENT DOCUMENTS

| | | |
|---|---|---|
| JP | H08320365 A | 12/1996 |
| JP | 2001116564 A | 4/2001 |

(Continued)

*Primary Examiner* — Tai T Nguyen
(74) *Attorney, Agent, or Firm* — Harness, Dickey & Pierce, P.L.C.

(57) ABSTRACT

A position detection apparatus is mounted in a vehicle, and communicates wirelessly with a mobile terminal of a target person to be notified, and thereby detects a relative position of the mobile terminal. The position detection apparatus is provided with: a satellite signal receiver receiving a positioning signal; a correction signal receiver receiving a correction signal; a terminal position communicator receiving by wireless communication from the mobile terminal the acquired positioning signal of the mobile terminal; and a corrected-position calculation portion correcting the received positioning signals of both the mobile terminal and the satellite signal receiver using the correction signal, and calculating the positional relationship of the mobile terminal in relation to the vehicle on the basis of the vehicle position information and the terminal position information based on the corrected positioning signals.

9 Claims, 10 Drawing Sheets

(51) Int. Cl.
    *G01C 21/28* (2006.01)
    *G01S 19/07* (2010.01)
    *G08G 1/16* (2006.01)
    *G01S 19/51* (2010.01)
    *G08G 1/09* (2006.01)
    *G01S 19/40* (2010.01)

(52) U.S. Cl.
    CPC ............... *G01S 19/51* (2013.01); *G08G 1/09* (2013.01); *G08G 1/166* (2013.01)

(58) Field of Classification Search
    USPC ............... 340/433, 436, 442, 444, 445, 447
    See application file for complete search history.

(56) References Cited

FOREIGN PATENT DOCUMENTS

| | | |
|---|---|---|
| JP | 2005339432 A | 12/2005 |
| JP | 2007279911 A | 10/2007 |
| JP | 2010085256 A | 4/2010 |
| JP | 2012211843 A | 11/2012 |
| JP | 2016136340 A | 7/2016 |
| WO | WO-2016121387 A1 | 8/2016 |

\* cited by examiner

# POSITION DETECTION APPARATUS, POSITION DETECTION METHOD, AND POSITION DETECTION SYSTEM

CROSS REFERENCE TO RELATED APPLICATIONS

This application is a U.S. National Phase Application under 35 U.S.C. 371 of International Application No. PCT/JP2016/070761 filed on Jul. 14, 2016 and published in Japanese as WO 2017/022438 A1 on Feb. 9, 2017. This application is based on and claims the benefit of priority from Japanese Patent Application No. 2015-155344 filed on Aug. 5, 2015. The entire disclosures of all of the above applications are incorporated herein by reference.

TECHNICAL FIELD

The present disclosure relates to a technique that uses wireless communication between an on-vehicle device that is mounted in a vehicle and a mobile terminal that is carried by a target person to be notified located in the vicinity of the vehicle and thereby detects their respective relative positions.

BACKGROUND ART

A conventional type of technique to detect a relative positional relationship between a vehicle and a pedestrian includes a terminal positioning system that uses an on-vehicle camera to detect a relative position of a pedestrian as disclosed in, for example, Patent Literature 1. Information on a relative position of the pedestrian obtained by the on-vehicle camera is transmitted together with information on the position of the vehicle based on a GPS (global positioning system) to a mobile terminal and used to enhance the accuracy of the positional information in the mobile terminal.

PRIOR ART LITERATURES

Patent Literature

Patent Literature 1: JP 2010-85256 A

SUMMARY OF INVENTION

The technique like the one disclosed in Patent Literature 1 that uses an on-vehicle camera to detect a relative position of a target person to be notified, such as a pedestrian, substantially cannot detect the relative position of a target person to be notified located in a position not directly visible from the vehicle.

It is an object of the present disclosure to provide a technique that enables highly accurate detection of a positional relationship between a vehicle and a target person to be notified who may be located in a position not directly visible from the vehicle.

According to one aspect of the present disclosure, a position detection apparatus that is mounted in a vehicle and detects a relative position of a mobile terminal on a target person to be notified located in a vicinity of the vehicle by achieving wireless communication with the mobile terminal is provided. The position detection apparatus includes: a satellite signal receiver that receives a positioning signal transmitted from a positioning satellite; a correction signal receiver that receives a correction signal for correcting the positioning signal; a terminal position communicator that receives the positioning signal acquired by the mobile terminal from the mobile terminal via the wireless communication; and a corrected-position calculation portion that corrects positioning signals received by the mobile terminal and the satellite signal receiver by using the correction signal and calculates a positional relationship of the mobile terminal with respect to the vehicle from vehicle position information and terminal position information that are based on the positioning signals that are corrected.

According to the present disclosure, a positioning signal transmitted by a positioning satellite and received by the mobile terminal and the satellite signal receiver are both acquired by the position detection apparatus and corrected by the position detection apparatus using a correction signal. It may be possible that the position detection apparatus calculates the absolute positions of the vehicle and the mobile terminal with high accuracy based on the corrected positioning signals. Accordingly, it may be possible that the position detection apparatus performs highly accurate detection of a relative positional relationship between a vehicle and a target person to be notified who may be located in a position not directly visible from the vehicle by using the vehicle position information and the terminal position information that are calculated by the position detection apparatus.

According to another aspect of the present disclosure, a position detection method in which a mobile terminal carried by a target person to be notified located in a vicinity of a vehicle detects a relative position of an on-vehicle device mounted in the vehicle by achieving wireless communication with the on-vehicle device is provided. The position detection method includes: as steps performed by at least one processor included in the mobile terminal, a transmission step that transmits, as a terminal positioning signal, a positioning signal received from a positioning satellite to the on-vehicle device via the wireless communication; a reception step that receives from the on-vehicle device via the wireless communication vehicle position information and terminal position information that is calculated based on the terminal positioning signal corrected by the on-vehicle device by using a correction signal received by the on-vehicle device; and a corrected-position calculation step that calculates a positional relationship of the vehicle with respect to the mobile terminal from the terminal position information and the vehicle position information that are received in the reception step.

According to in the position detection method of the present disclosure, the on-vehicle device mounted in the vehicle corrects the terminal positioning signal, which is transmitted from the mobile terminal, by using the correction signal before calculating the terminal position information. Then, the on-vehicle device transmits the vehicle position information, together with the corrected terminal position information, so that the information is received by the mobile terminal. As a result, it may be possible that the mobile terminal performs highly accurate detection of a positional relationship of a vehicle with respect to a target person to be notified who may be located in a position not directly visible from the vehicle by using the vehicle position information and the terminal position information that are acquired from the on-vehicle device.

According to another aspect of the present disclosure, a position detection system includes: an on-vehicle device mounted in a vehicle; and a mobile terminal on a target person to be notified located in a vicinity of the vehicle, the position detection system enabling the on-vehicle device and the mobile terminal to share respective position information with each other via wireless communication. The mobile terminal receives a positioning signal transmitted by a positioning satellite and transmits the positioning signal as a terminal positioning signal to the on-vehicle device. The on-vehicle device includes: a satellite signal receiver that receives the positioning signal from the positioning satellite as a vehicle positioning signal; a correction signal receiver that receives a correction signal for correcting positioning signals; a terminal position communicator that receives the terminal positioning signal transmitted by the mobile terminal via the wireless communication; and a corrected-position calculation portion that corrects the terminal positioning signal and the vehicle positioning signal by using the correction signal and calculates a positional relationship of the mobile terminal with respect to the vehicle from vehicle position information and terminal position information that are based on the positioning signals that are corrected.

In such a position detection system, it may be possible that the on-vehicle device also performs highly accurate detection of a relative positional relationship between a vehicle and a target person to be notified.

That is, according to the present disclosure, it may be possible to detect a positional relationship between a vehicle and a target person to be notified who may be located in a position not directly visible from the vehicle with highly accurate.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Some embodiments of the present disclosure are described below with reference to the drawings. Identical symbols may be assigned to corresponding components in the embodiments and description thereof may be omitted. When a configuration is only partially described in an embodiment, description provided in preceding embodiments may be applicable for the rest of the configuration. In addition to combinations of configurations explicitly described in the embodiments, partial combinations of configurations in two or more of the embodiments may be made even if they are not described explicitly as long as such combinations can be made without difficulties. Any such implicit combinations of two or more of the embodiments or modifications are construed as being disclosed herein by the description below.

First Embodiment

Figure 1:
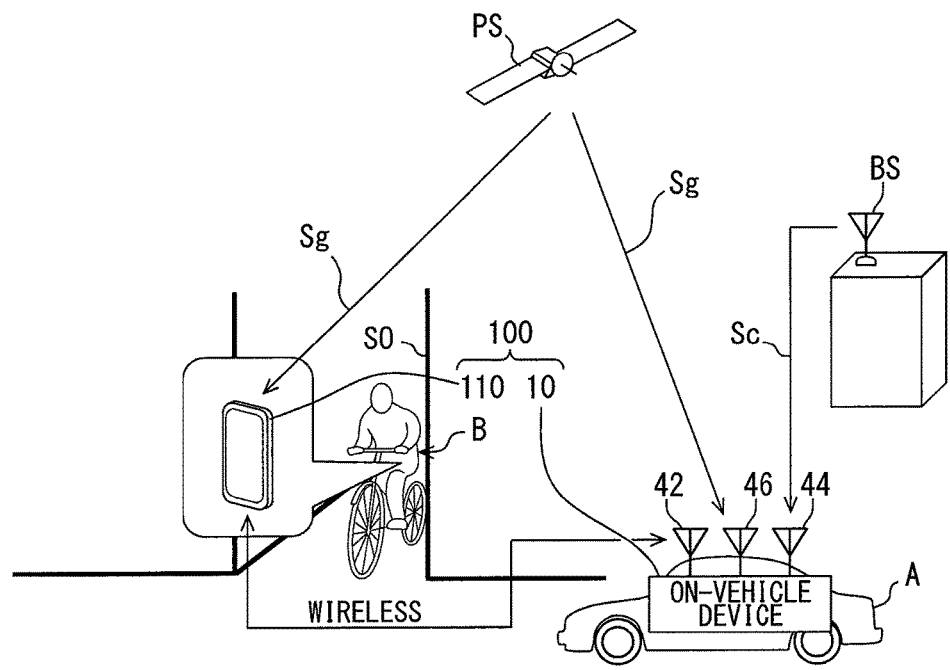
FIG. 1 is a diagram schematically illustrating a broad view of a position detection system according to a first embodiment.

A position detection system 100 illustrated in FIG. 1 includes mobile terminals 110, which are carried by many terminal possessors B, and on-vehicle devices 10, which are mounted in many vehicles A. In the position detection system 100, each mobile terminal 110 and each on-vehicle device 10 can share information on their respective positions or the like by transmitting and receiving the information via wireless communication using, for example, a wireless LAN. A wireless LAN that conforms to a widespread standard such as WiFi (registered trademark) may be suitable.

In the position detection system 100, an occupant of a vehicle A is notified of the presence of a terminal possessor B located in a traveling direction of the vehicle A. Additionally, the terminal possessor B can be also warned of the proximity to the vehicle A. In this manner, excessive proximity of the terminal possessor B and the vehicle A is prevented. Occupants of the vehicle A include a driver and a passenger of the vehicle A. The terminal possessors B include users of a light vehicle, such as a bicycle, personal mobility riders, and pedestrians. Of the terminal possessors B, who include such users, riders, and pedestrians, a passing person located in the vicinity of a vehicle A, specifically, in the traveling direction of the vehicle A, is the target person to be notified that an occupant of the vehicle A is notified of.

A mobile terminal 110 illustrated in FIGS. 1 and 2, which is, for example, a multifunctional mobile phone (also known as a smartphone), enables an application program that achieves the function of the position detection system 100 (hereinafter referred to as a terminal notification application) to operate. The mobile terminal 110 includes a display 111, a speaker 112, a wireless communication circuit 141, a mobile communication circuit 143, a GNSS (global navigation satellite system) signal reception circuit 145, and a terminal circuit 120.

The display 111 has multiple pixels arranged on a display screen that enables an image to be displayed in color. The speaker 112 can utter a sound. The display 111 and the speaker 112 can, together with other devices such as a vibrator, notify a terminal possessor B of information. The display 111, the speaker 112, or the like notify the terminal possessor B of the proximity of the vehicle A by the operation of the terminal notification application in the mobile terminal 110. The display 111 has the function of a touch panel, which can detect the operation of the terminal possessor B on the display screen. The terminal possessor B can operate on the display screen to, for example, start and stop the terminal notification application and change a setting value of the terminal notification application.

The wireless communication circuit 141 is connected to an antenna 142 for wireless communication. The antenna 142 is configured so as to be able to transmit and receive an electric wave in conformance with WiFi standards. The wireless communication circuit 141 transmits and receives information to/from a wireless LAN device, such as an on-vehicle device 10 that is located within a communication range via the antenna 142. The communication range of the wireless communication circuit 141 is, for example, a radius of about 100 meters at maximum.

The mobile communication circuit 143 is connected to an antenna 144 for mobile communication. The mobile communication circuit 143 transmits and receives information to/from a base station BS via the antenna 144. The mobile communication circuit 143 can interchange information with, for example, a device, such as a server, that is connected to the Internet via the base station BS. The communication range of the mobile communication circuit 143 is greater than that of the wireless communication circuit 141.

The GNSS signal reception circuit 145 is connected to an antenna 146 for receiving positioning signals transmitted by multiple positioning satellites PS. The positioning satellites PS are artificial satellites that are in orbit at an altitude of approximately 20,000 km. The positioning satellites PS include a GPS satellite and a quasi-zenith satellite. A positioning signal includes satellite information indicative of a satellite number unique to a corresponding positioning satellite PS and other satellite information including the latitude, longitude, and altitude of the positioning satellite PS indicative of its position, and time. The GNSS signal reception circuit 145 receives signals, such as a GNSS signal Sg, that are transmitted by the multiple positioning satellites PS in a predefined cycle (1 Hz, for example) and transfers the signals as terminal positioning signals to the terminal circuit 120 sequentially. A position of the terminal based on the GNSS signal Sg received by the GNSS signal reception circuit 145 can be deemed as the current position of the terminal possessor B who carries the mobile terminal 110.

Figure 2:
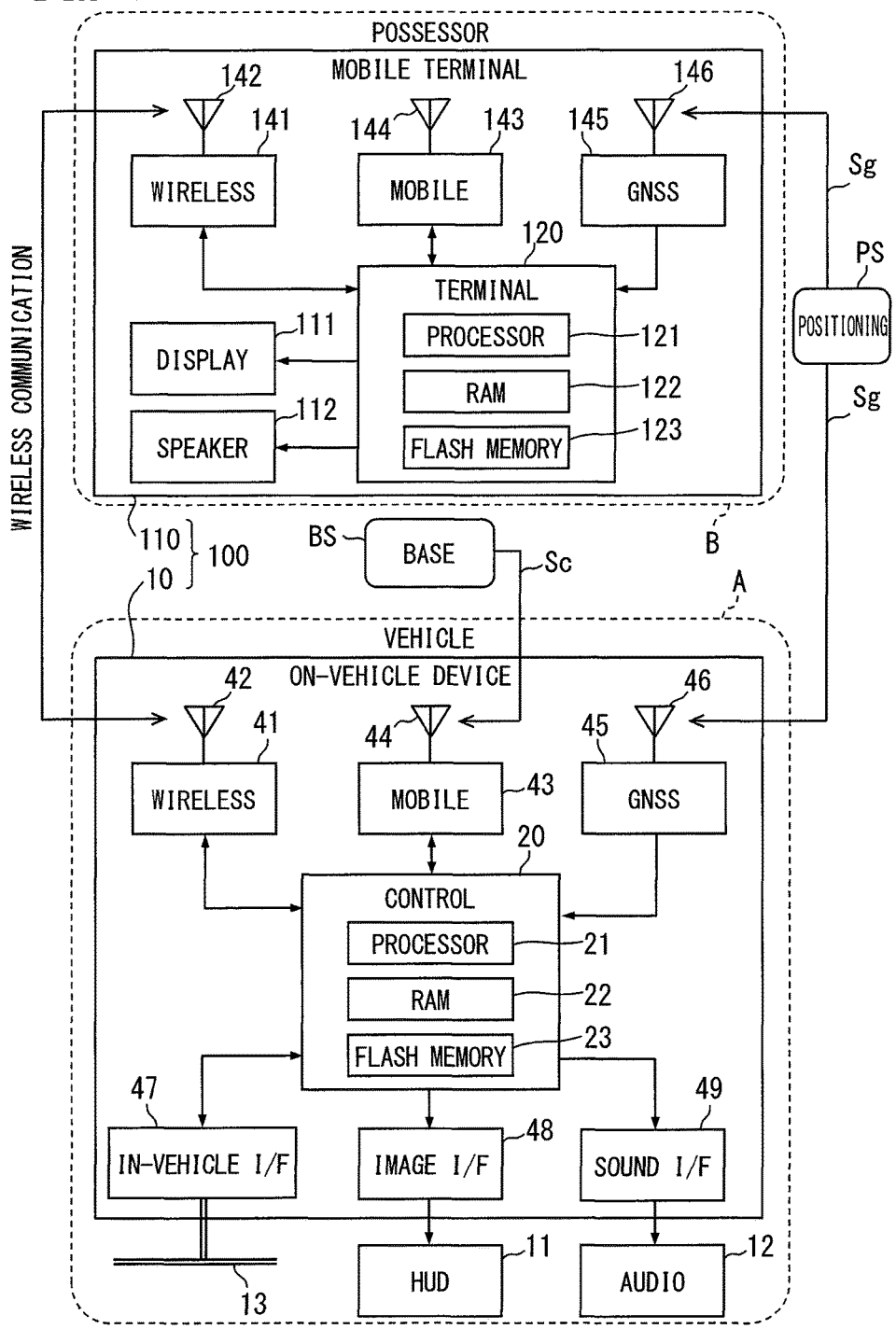
FIG. 2 is a block diagram illustrating a configuration of the position detection system according to the first embodiment.
Figure 3:
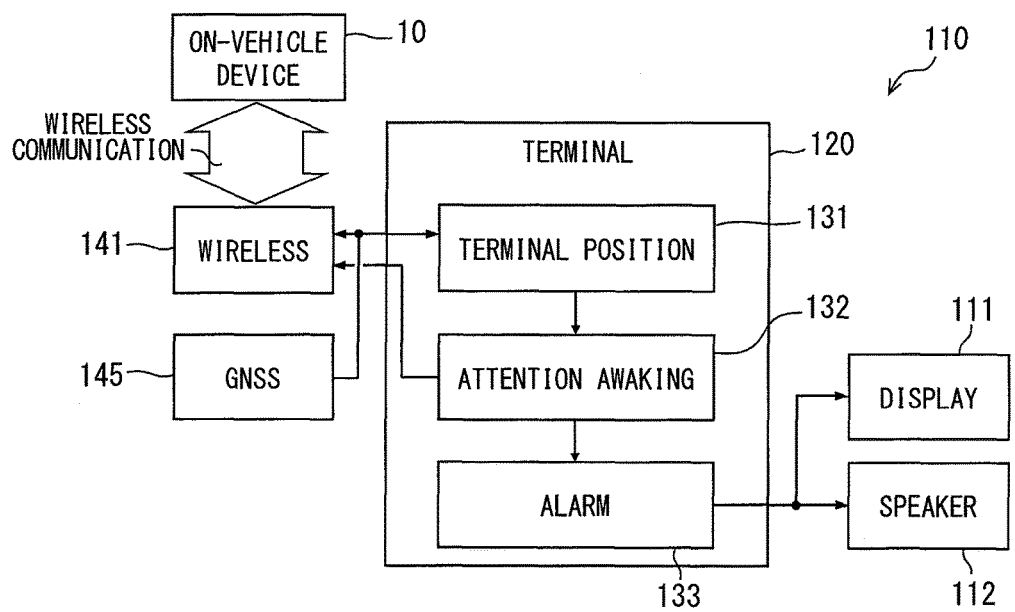
FIG. 3 is a diagram illustrating functional blocks configured in a mobile terminal for position detection.

As illustrated in FIGS. 2 and 3, the terminal circuit 120 is connected to the display 111, the speaker 112, the wireless communication circuit 141, the mobile communication circuit 143, and the GNSS signal reception circuit 145. The terminal circuit 120 includes, as a main component, a microcomputer that includes a processor 121, a RAM 122, a flash memory 123, and a bus that connects these components. The processor 121 can perform various calculation processes based on an application program. The RAM 122 functions as a work area for the calculation of the processor 121. The flash memory 123 is a non-transitory tangible storage medium that stores information such as a program. The terminal circuit 120 includes a terminal position calculation portion 131, an attention awaking determination portion 132, and an alarm control portion 133 as functional blocks achieved by the execution of the terminal notification application by the processor 121.

The terminal position calculation portion 131 acquires the GNSS signal Sg or the like output by the GNSS signal reception circuit 145 and detects the position of the terminal based on the acquired GNSS signal Sg or the like. The terminal circuit 120 can complement the result of positioning of the terminal as necessary by using acceleration detected by an acceleration sensor, a yaw rate detected by a gyro sensor, or the like. The terminal position calculation portion 131 also calculates the moving direction and the moving speed of the mobile terminal 110 from, for example, the progression of the position of the terminal and a result of detection by the acceleration sensor. The acceleration sensor and the gyro sensor are motion sensors mounted in the mobile terminal 110.

The terminal position calculation portion 131 controls the wireless communication circuit 141 such that the GNSS signal Sg received by the GNSS signal reception circuit 145 and information indicative of the moving direction and the moving speed are radiated in the vicinity of the terminal possessor B repetitively in a preset cycle. The terminal position calculation portion 131 can also acquire information indicative of the position of the vehicle (hereinafter referred to as vehicle position information) and information indicative of the position of the terminal (hereinafter referred to as terminal position information) transmitted by the on-vehicle device 10 via the wireless communication circuit 141. The terminal position calculation portion 131 can calculate a positional relationship of the vehicle A with respect to the mobile terminal 110 by using the vehicle position information and the terminal position information.

The attention awaking determination portion 132 determines whether to notify the terminal possessor B on the basis of a relative distance between the mobile terminal 110 and the vehicle A calculated by the terminal position calculation portion 131. When the vehicle A is in closer proximity to the terminal possessor B than a predefined distance, the attention awaking determination portion 132 issues a command for the alarm control portion 133 to provide a notification for warning. Such determination and issuance of a command may be performed in stages as the proximity of the vehicle A and the terminal possessor B increases. The attention awaking determination portion 132 can control the wireless communication circuit 141 so as to inform, via the wireless communication, the on-vehicle device 10 of a notification provided to the terminal possessor B.

The alarm control portion 133 provides, based on the command from the attention awaking determination portion 132, the notification for the terminal possessor B to warn of the proximity of the vehicle A. The alarm control portion 133 can warn the terminal possessor B of the proximity of the vehicle A by using multiple information transfer means, such as vibration of the vibrator, reproduction of a warning sound by the speaker 112, presentation of a warning screen by the display 111.

As illustrated in FIGS. 1 and 2, the on-vehicle device 10 is a control unit mounted in the vehicle A. The on-vehicle device 10 enables an application program that achieves the function of the position detection system 100 (hereinafter referred to as a vehicle notification application) to operate. The on-vehicle device 10 may be a control unit dedicated to detection of the relative position of a terminal possessor B. Alternatively, the on-vehicle device 10 may be a control unit, such as an HCU (HMI control unit), that controls a user interface of the vehicle A in an integrated manner. The acronym HMI represents human machine interface.

The on-vehicle device 10 is connected to a communication bus 13 of an on-vehicle local area network (LAN), a head-up display (hereinafter referred to as HUD) device 11, an audio device 12, or the like. The on-vehicle LAN is a communication network connected to many on-vehicle control devices mounted in the vehicle A. The on-vehicle control devices output information to the communication bus 13 of the on-vehicle LAN.

The HUD device 11 causes the light of an image emitted by a projector to reflect off an optical system such that the image appears on a windshield of the vehicle A. A driver in a driver seat of the vehicle A can perceive the light reflected by the windshield into a cabin of the vehicle and thereby see a virtual image of the image overlaid on a front view through the windshield of the vehicle.

The audio device 12 is provided with multiple speakers disposed in the cabin. The audio device 12 can transfer various types of information to the driver by a sound that is uttered by the speakers and reproduction of a notifying sound.

The on-vehicle device 10 includes an in-vehicle communication interface 47, an image output interface 48, a sound output interface 49, a wireless communication circuit 41, a mobile communication circuit 43, a GNSS signal reception circuit 45, and a control circuit 20.

The in-vehicle communication interface 47 is connected to the communication bus 13. The in-vehicle communication interface 47 can acquire information on the vehicle A output to the on-vehicle LAN, such as, for example, traveling speed, the acceleration, and the yaw rate. The image output interface 48 is connected to the HUD device 11. The image output interface 48 outputs to the HUD device 11 image data whose virtual image is to be displayed by the HUD device 11. The sound output interface 49 is connected to the audio device 12. The sound output interface 49 outputs to the audio device 12 sound data to be reproduced by the speakers in the cabin.

The wireless communication circuit 41 is connected to an antenna 42 for wireless communication. The antenna 42 is configured so as to be able to transmit and receive an electric wave in conformance with the WiFi standards. The antenna 42 is attached on the windshield or the like of the vehicle A with the orientation of the antenna 42 facing in a traveling direction of the vehicle A so as to receive an electric wave transmitted from the traveling direction of the vehicle A with high sensitivity. The wireless communication circuit 41 can transmit and receive information to/from a mobile terminal 110 that is located within a communication range via the antenna 42. The wireless communication circuit 41 can receive the GNSS signal Sg or the like transmitted from the antenna 142 of the mobile terminal 110. The communication range of the wireless communication circuit 41 is, for example, less than a radius of about 100 meters.

The mobile communication circuit 43 is connected to an antenna 44 for mobile communication. The mobile communication circuit 43 transmits and receives information to/from a base station BS via the antenna 44. The mobile communication circuit 43 can interchange information with, for example, a device, such as a server, that is connected to the Internet via the base station BS. The communication range of the mobile communication circuit 43 is greater than that of the wireless communication circuit 41.

The mobile communication circuit 43 can receive a correction signal Sc for correcting a GNSS signal Sg. Specifically, GNSS signals Sg received by the GNSS signal reception circuits 45 and 145 have values inevitably deviated from the respective correct values due to factors such as an error in satellite orbit information indicative of the latitude, longitude, and altitude of a corresponding positioning satellite PS and a signal delay in a convection zone and an ionospheric layer. The correction signal Sc includes information for correcting such a deviation. The correction signal Sc includes a correction value for correcting information such as the latitude, longitude, altitude, time, or the like included in the GNSS signal Sg for each positioning satellite PS. A GNSS signal Sg transmitted from each positioning satellite PS is associated with a correction value corresponding to the sending one of the positioning satellites PS on the basis of the satellite number. Each GNSS signal Sg is individually corrected using the associated correction value and then used for detection of the position.

Figure 5:
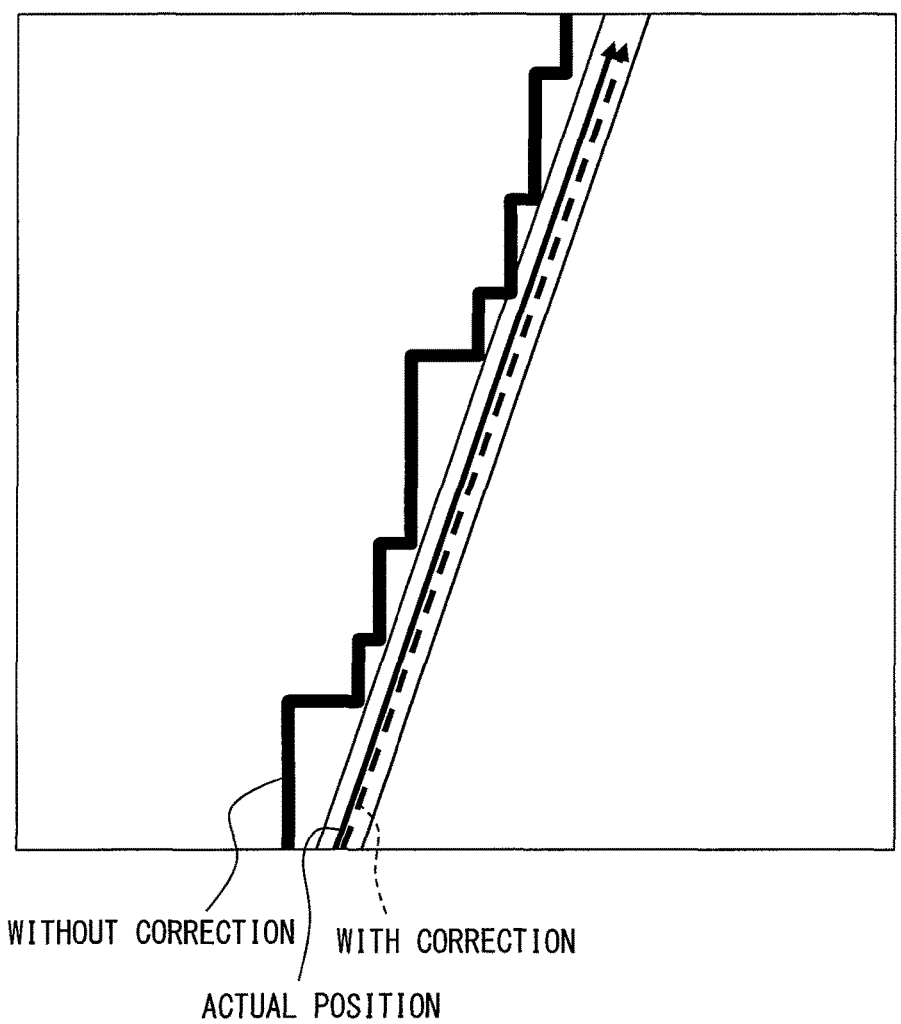
FIG. 5 is a diagram illustrating an effect of correction using a correction signal.

A detected position based on the GNSS signal Sg without the correction using the correction signal Sc (see a thick line in FIG. 5) may deviate from the actual traveling position of the vehicle A (see a solid line in FIG. 5) by, for example, about 10 meters. In contrast, a corrected position based on the GNSS signal Sg with the correction using the correction signal Sc (see a broken line in FIG. 5) deviates from the actual traveling position by only about 0.5 meter.

The correction signal Sc described above generally has a large amount of data and thus may cause a problem, among others, that continuous reception by the mobile terminal 110 is difficult or takes excessive communication time. The correction signal Sc has different content for different pre-zoned areas and for different time frames. An area is, for example, in a range of a few kilometers. The mobile communication circuit 43 can receive not only a piece of information of the correction signal Sc that corresponds to an area in which the vehicle A is currently located (also referred to as a first area) but also a piece of information of the correction signal Sc that corresponds to a different area (also referred to as a second area). Specifically, the mobile communication circuit 43 can receive a piece of information of the correction signal Sc that corresponds to a different area to which the vehicle A is planned to move, a piece of information of the correction signal Sc that corresponds to an area adjacent to an area in which the vehicle A is currently located, or the like.

The GNSS signal reception circuit 45 is connected to an antenna 46. The antenna 46 can receive GNSS signals Sg as positioning signals transmitted by the multiple positioning satellites PS, as in the case with the antenna 146 of the mobile terminal 110. The GNSS signal reception circuit 45 receives signals, such as the GNSS signal Sg, that are transmitted by the multiple positioning satellites PS in a predefined cycle and transfers the signals as vehicle positioning signals to the control circuit 20 sequentially. A position of the on-vehicle device 10 based on the GNSS signal Sg received by the GNSS signal reception circuit 45 can be deemed as the current position of the vehicle A in which the on-vehicle device 10 is mounted.

Figure 4:
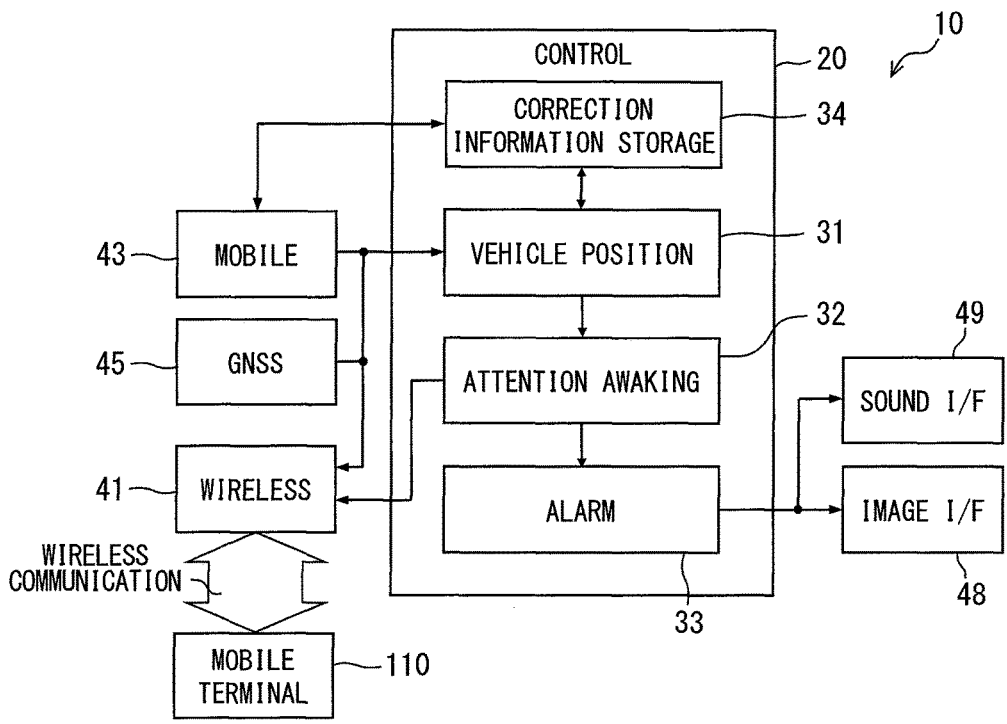
FIG. 4 is a diagram illustrating functional blocks configured in an on-vehicle device for position detection.

As illustrated in FIGS. 2 and 4, the control circuit 20 is connected to the interfaces 47 to 49 and circuits 41, 43, and 45. The control circuit 20 includes, as a main component, a microcomputer that includes a processor 21, a RAM 22, a flash memory 23, and a bus that connects these components. The processor 21 can perform various calculation processes based on an application program. The RAM 22 functions as a work area for the calculation of the processor 21. The flash memory 23 is a non-transitory tangible storage medium that stores information such as a program. The control circuit 20 includes a vehicle position calculation portion 31, an attention awaking determination portion 32, an alarm output portion 33, and a correction information storage portion 34 as functional blocks achieved by the execution of the vehicle notification application by the processor 21.

The vehicle position calculation portion 31 acquires the GNSS signal Sg output by the GNSS signal reception circuit 45 or the like and detects the position of the vehicle based on the acquired GNSS signal Sg or the like. The control circuit 20 can acquire acceleration detected by an acceleration sensor mounted in the vehicle, a yaw rate detected by a gyro sensor mounted in the vehicle, or the like via the in-vehicle communication interface 47 as necessary and complement the result of the positioning of the vehicle by using such information. The vehicle position information calculated by the vehicle position calculation portion 31 includes a value indicative of, for example, an absolute position, such as the latitude and longitude.

The vehicle position calculation portion 31 can correct the GNSS signal Sg by using information of the correction signal Sc acquired via the mobile communication circuit 43. When the wireless communication circuit 41 receives a GNSS signal Sg transmitted by the mobile terminal 110, the vehicle position calculation portion 31 can also correct the received GNSS signal Sg by using the information of the correction signal Sc. The vehicle position calculation portion 31 can detect the position of the mobile terminal 110 based on the corrected GNSS signal Sg. The terminal position information calculated by the vehicle position calculation portion 31 includes a value indicative of an absolute position, such as the latitude and longitude, as in the case with the vehicle position information.

As described above, the correction signal Sc has common content throughout an area. There is a high probability that a terminal possessor B and a vehicle A located at a distance from each other that allows the WiFi communication are located in an identical area. Thus, calculation of the terminal position information using the GNSS signal Sg received by the mobile terminal 110 and the correction signal Sc received by the on-vehicle device 10 can result in an accurately corrected value.

In addition to the calculation of the terminal position information, the vehicle position calculation portion 31 can also receive the moving direction and the moving speed of the mobile terminal 110 via the wireless communication circuit 41. The vehicle position calculation portion 31 can further correct the terminal position information calculated based on the corrected GNSS signal Sg by using the moving direction and the moving speed.

When the wireless communication circuit 41 receives the GNSS signal Sg acquired by the mobile terminal 110 or the like, the vehicle position calculation portion 31 calculates a relative positional relationship of the mobile terminal 110 with respect to the vehicle A. The calculation of such a relative positional relationship uses the vehicle position information and the terminal position information that are based on the GNSS signals Sg corrected using the information of the correction signal Sc. The vehicle position calculation portion 31 calculates, by a geometrical method, the relative position of the terminal possessor B based on the values of the longitude and latitude included in both the vehicle position information and the terminal position information. The vehicle position calculation portion 31 can control the wireless communication circuit 41 so as to transmit the corrected terminal position information and the corrected vehicle position information to the mobile terminal 110.

The attention awaking determination portion 32 determines whether to notify the driver of the vehicle A on a basis of a relative distance between the mobile terminal 110 and the vehicle A calculated by the vehicle position calculation portion 31. When the terminal possessor B is in closer proximity to the vehicle A than a predefined distance, the attention awaking determination portion 32 issues a command for the alarm output portion 33 to provide a notification. Such determination and issuance of a command may be performed in stages as the proximity of the terminal possessor B and the vehicle A increases. The attention awaking determination portion 32 can control the wireless communication circuit 41 so as to transmit to the mobile terminal 110 a command signal that instructs the mobile terminal 110 to start a notification for the terminal possessor B.

The alarm output portion 33 provides the notification for the driver to warn of the proximity of the terminal possessor B based on the command from the attention awaking determination portion 32. The alarm output portion 33 can warn the driver of the proximity of the terminal possessor B by using multiple information transfer means, such as reproduction of a warning sound by the audio device 12 and presentation of a virtual image of a warning screen by the HUD device 11.

The correction information storage portion 34 can store the information of the correction signal Sc received by the mobile communication circuit 43. The information of the correction signal Sc stored in the correction information storage portion 34 is used for the correction of the GNSS signal Sg by the vehicle position calculation portion 31 when the correction signal is unavailable for reception by the mobile communication circuit 43.

The correction information storage portion 34 can store not only a piece of information of the correction signal Sc that corresponds to an area in which the vehicle A is currently located but also a piece of information of the correction signal Sc that corresponds to a different area by causing the mobile communication circuit 43 to receive such pieces of information of the correction signal Sc. Specifically, the correction information storage portion 34 can store a piece of information of the correction signal Sc that corresponds to an area adjacent to the area in which the vehicle A is currently located. Hence, when the vehicle A has moved to the adjacent area while a correction signal Sc is unlikely to be received, the vehicle position calculation portion 31 can correct the GNSS signal Sg by using the piece of information of the correction signal Sc that corresponds to the adjacent area.

Setting a destination in a navigation system mounted in the vehicle A clarifies an area to which the vehicle A is planned to move. The correction information storage portion 34 can store pieces of information of the correction signal Sc that correspond to areas that include a route from the current position to the destination. Hence, when a correction signal Sc is unlikely to be received while the vehicle A is traveling through the route to the planned destination, the vehicle position calculation portion 31 selects a piece of information of the correction signal Sc that corresponds to the current position of the vehicle A from the pieces of information stored in the correction information storage portion 34, so that it may be possible to correct the GNSS signal Sg by using the selected piece of information.

The information of the correction signal Sc stored in the correction information storage portion 34 as described above may be raw data of the received signal or tendency data estimated from the correction signal Sc. Specifically, deviations of detected positions based on GNSS signals Sg from the actual positions have a tendency related to the location and the time. When detected positions have a tendency to deviate from the actual positions by, for example, 5 meters in a north direction, the correction information storage portion 34 can retain vector data including the direction and magnitude of the deviations as the tendency data.

Figure 6:
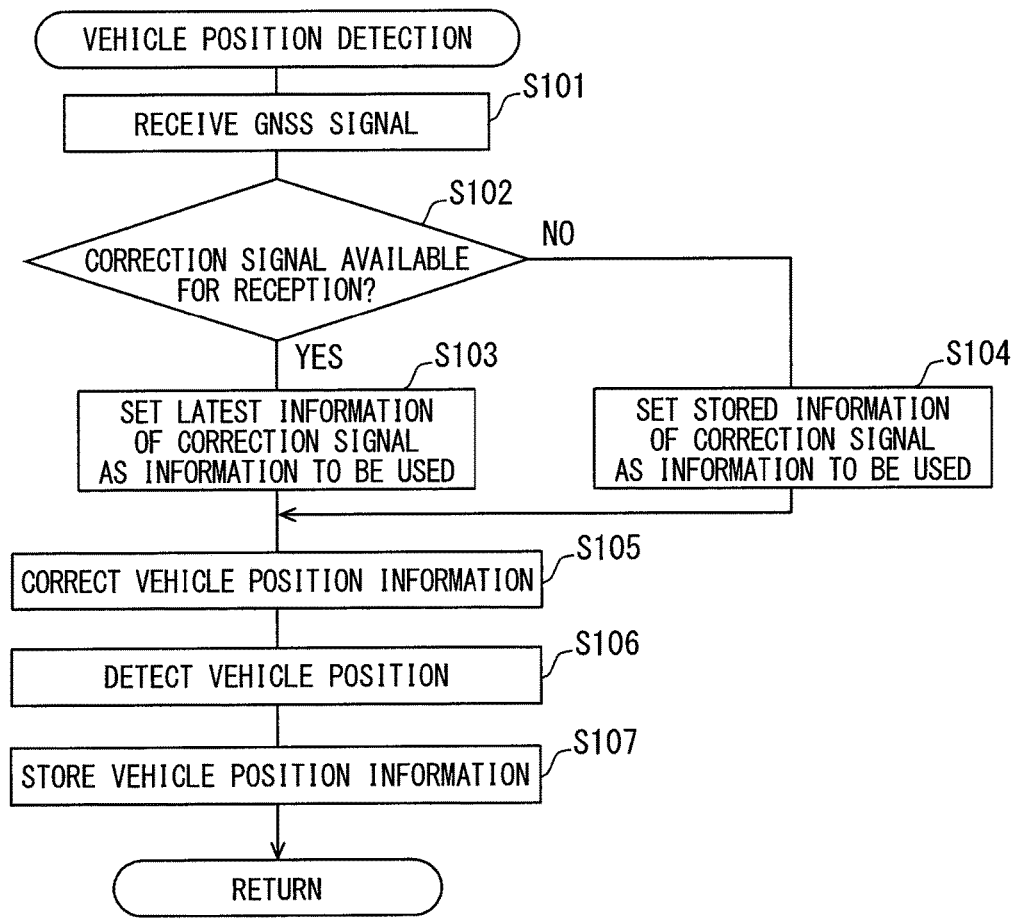
FIG. 6 is a flowchart illustrating a vehicle position detection process to be performed by a control circuit of the on-vehicle device.
Figure 7:
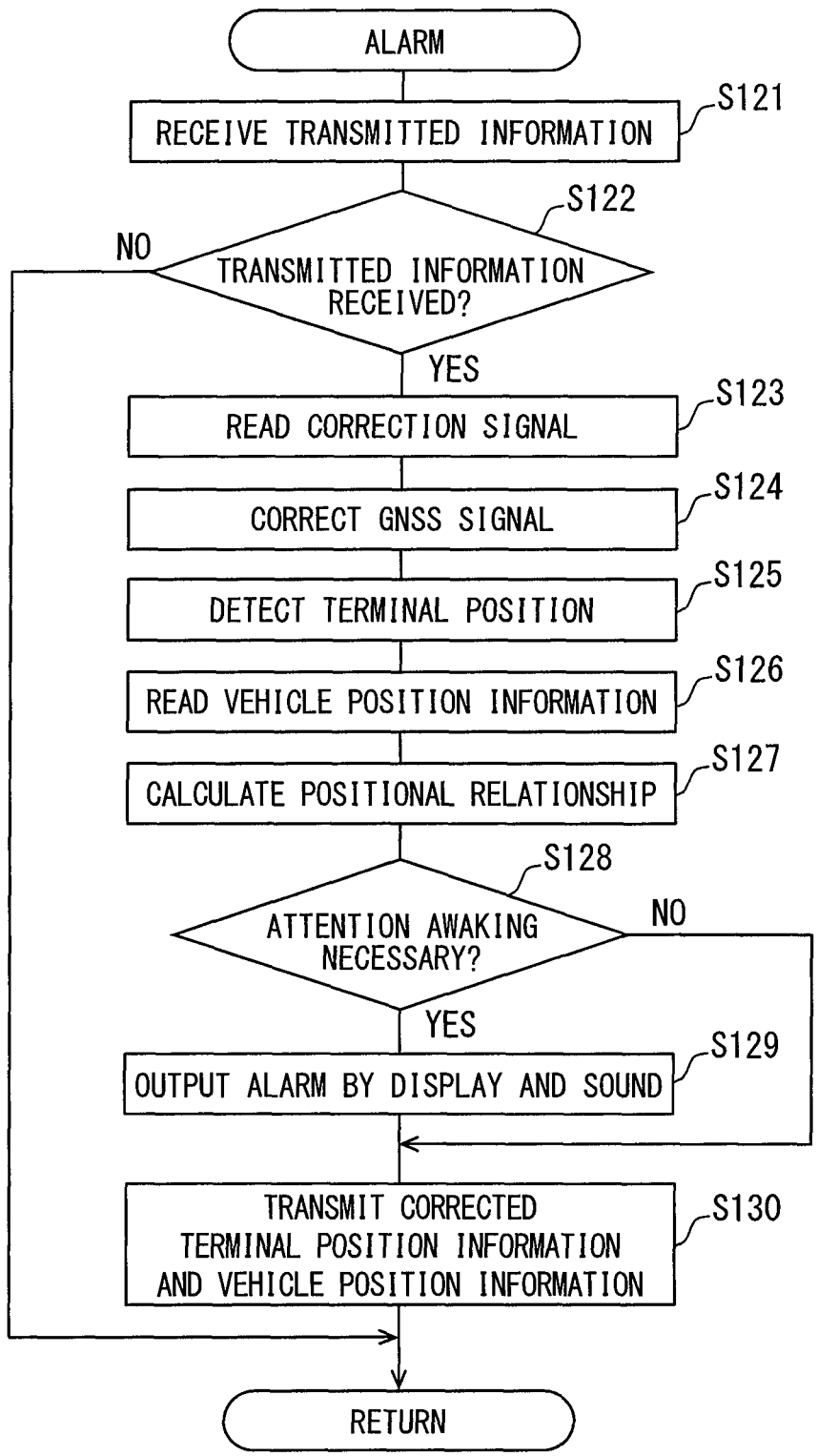
FIG. 7 is a flowchart illustrating an alarm process to be performed by the control circuit.

The control circuit 20 described above performs, as processes to share the position information with the mobile terminal 110, a vehicle position detection process illustrated in a flowchart of FIG. 6 and an alarm process illustrated in a flowchart of FIG. 7. These processes are started based on, for example, the start of the vehicle notification application that accompanies the tuning on of the ignition and repeated by the control circuit 20 until the end of the vehicle notification application that accompanies the turning off of the ignition. These processes are described below one by one in detail based on FIGS. 6 and 7 with reference to FIGS. 2 and 4.

In the vehicle position detection process in FIG. 6, a receiving process in which the GNSS signal reception circuit 45 receives a GNSS signal Sg is performed in S101. The process proceeds to S102. It is determined in S102 whether the correction signal Sc is available for reception by the mobile communication circuit 43. When it is determined in S102 that the correction signal Sc is available for reception, the process proceeds to S103.

The latest information of the correction signal Sc is set in S103 as the information to be used in S105, in the alarm process (see FIG. 7), or the like. The process proceeds to S105. When it is determined in S102 that a correction signal Sc is unlikely to be received, the process proceeds to S104. A piece of information of the correction signal Sc that corresponds to an area in which the vehicle A is currently located is read in S104 from the information of the correction signal Sc stored in the correction information storage portion 34. The piece of information of the correction signal Sc that has been read is then set as the information to be used in S105, in the alarm process (see), or the like. The process proceeds to S105.

The GNSS signal Sg received in S101 is corrected in S105 by using the information of the correction signal Sc set in S103 or S104. The process proceeds to S106. The vehicle position is detected in S106 based on the GNSS signal Sg corrected in S105. The process proceeds to S107. The vehicle position information corrected in S106 is stored in S107 in a predefined storage area in the flash memory 23 or the RAM 22. The process reverts back to S101.

The alarm process is described below in detail with reference to FIG. 7. A receiving process in which information of a GNSS signal Sg or the like transmitted from the mobile terminal 110 is received by the wireless communication circuit 41 is performed in S121. The process proceeds to S122. It is determined in S121 whether the information is received in S122. When it is determined in S122 that the information is not received, the process reverts back to S121 and standby is maintained where S121 and S122 are repeated until the reception of the information is started.

When it is determined in S122 that the information is received, the process proceeds to S123. The information of the correction signal Sc set in the vehicle position detection process (see FIG. 6) as the information to be used in the alarm process is read in S123. The process proceeds to S124. The GNSS signal Sg included in the information transmitted from the mobile terminal 110 is corrected in S124 by using the information of the correction signal Sc read in S123. The process proceeds to S125. The terminal position is calculated in S125 based on the GNSS signal Sg corrected in S124. The process proceeds to S126.

The corrected vehicle position information stored in S107 (see FIG. 6) is read in S126 from the storage area. The process proceeds to S127. The positional relationship of the mobile terminal 110 with respect to the vehicle A, that is, a relative distance from the mobile terminal 110 to the vehicle A, is calculated in S127 by using the terminal position information calculated in S125 and the vehicle position information read in S126. The process proceeds to S128.

It is determined in S128 whether the relative distance calculated in S127 has reached a distance that necessitates an alert. When it is determined in S128 that an alert is necessary, the process proceeds to S129. A command signal is output in S129 to the HUD device 11 and the audio device 12 such that alarms by the display of a virtual image and a sound are provided for the driver or the like. The process proceeds to S130. The alarms in S129 are continued until no terminal position information is received or until a predefined time period elapses from the start of the alarm.

When it is determined in S128 that no alert is necessary, the process proceeds to S130, skipping S129. The terminal position information based on the corrected GNSS signal Sg, together with the vehicle position information, is transmitted in S130 to the mobile terminal 110. The process reverts back to S121.

Figure 8:
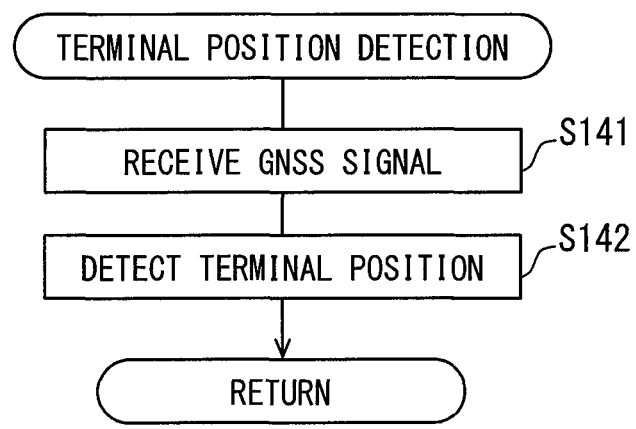
FIG. 8 is a flowchart illustrating a terminal position detection process to be performed by a terminal circuit of the mobile terminal.
Figure 9:
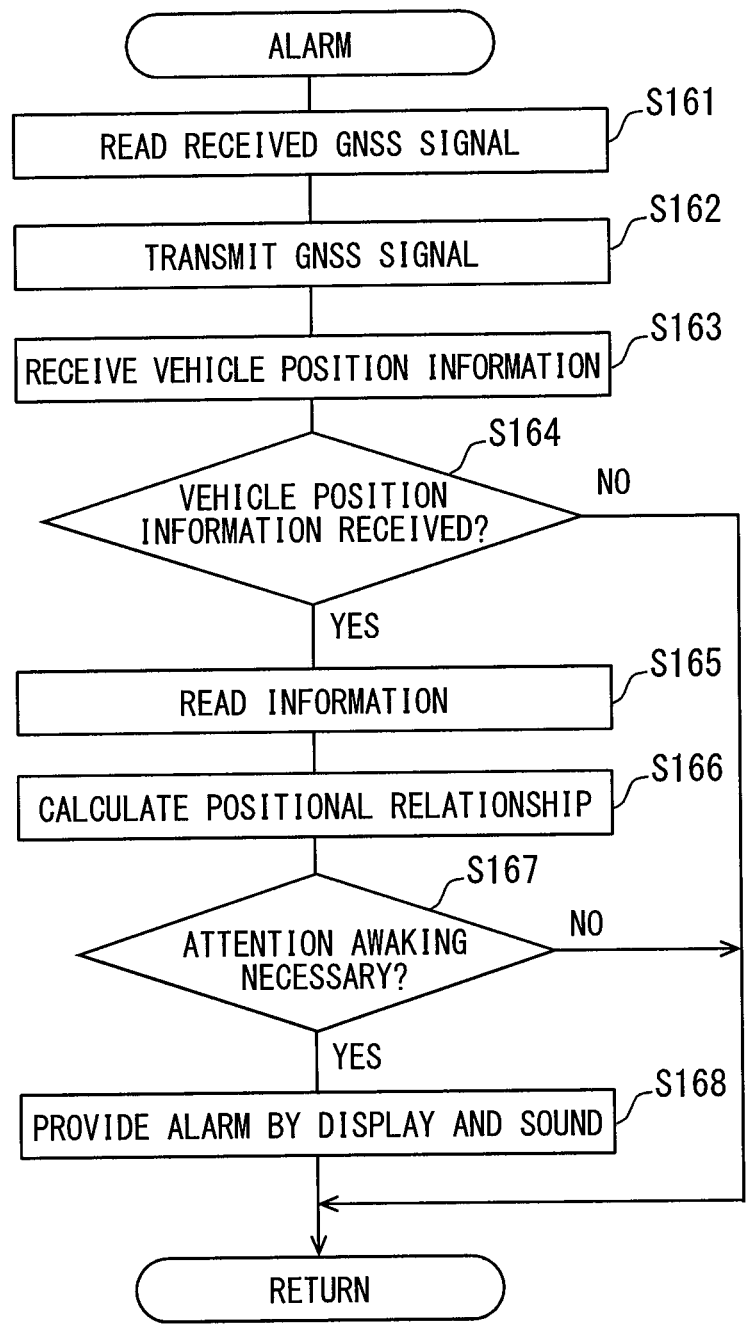
FIG. 9 is a flowchart illustrating an alarm process to be performed by the terminal circuit.

In association with the processes by the control circuit 20 described above, the terminal circuit 120 performs, as processes to share the position information with the on-vehicle device 10, a terminal position detection process illustrated in a flowchart of FIG. 8 and an alarm process illustrated in a flowchart of FIG. 9. These processes are started based on, for example, the operation input to start the terminal notification application and repeated by the terminal circuit 120 until the end of the terminal notification application. These processes are described below one by one in detail based on FIGS. 8 and 9 with reference to FIGS. 2 and 3.

In the terminal position detection process in FIG. 8, a receiving process in which the GNSS signal reception circuit 145 receives a GNSS signal Sg is performed in S141. The process proceeds to S142. The terminal position information is detected in S142 based on the GNSS signal Sg received in S141. The process reverts back to S141. The terminal position detection process described above is performed with a frequency (for example, every one second) lower than the frequency with which the terminal position information is transmitted (for example, every 100 milliseconds) in the alarm process (see FIG. 9).

The alarm process is described below in detail with reference to FIG. 9. This alarm process includes a position detection method to detect a relative position of the on-vehicle device 10. The GNSS signal Sg received in S141 (see FIG. 8) is read in S161. The process proceeds to S162. A transmitting process in which information including the GNSS signal Sg read in S161 is transmitted is performed in S162. The process proceeds to S163. The GNSS signal Sg to be transmitted in S162 includes raw data of satellite information indicative of the satellite number, the satellite position, time, or the like. In the transmitting process in S162, the information is broadcast with no destination specified.

A receiving process in which the vehicle position information, the corrected terminal position information, or the like transmitted from the on-vehicle device 10 are received is performed in S163. The process proceeds to S164. It is determined in S164 whether the vehicle position information and the other information are received in S163. When it is determined that the vehicle position information and the other information are not received in S164, the process reverts back to S161, skipping S165 to S168. When it is determined in S164 that the vehicle position information and the other information are received, the process proceeds to S165.

The vehicle position information and the terminal position information received from the on-vehicle device 10 are read in S165. The process proceeds to S166. When the corrected terminal position information has not been received from the on-vehicle device 10, the terminal position information detected in S142 (see FIG. 8) is read in S165. The positional relationship of the vehicle A with respect to the mobile terminal 110 is calculated in S166. The process proceeds to S167. It is determined in S167 whether the relative distance calculated in S166 has reached a distance that necessitates an alert. When it is determined in S167 that no alert is necessary, the process reverts back to S161, skipping S168.

When it is determined in S167 that an alert is necessary, the process proceeds to S168. The display 111 and the speaker 112 are controlled in S168 such that alarms by display and a sound are provided for the terminal possessor B. The process reverts back to S161. The alarms in S168 are continued until no vehicle position information is received or until a predefined time period elapses from the start of the alarm.

In the first embodiment described above, GNSS signals Sg transmitted by a positioning satellite PS and received by the mobile terminal 110 and the GNSS signal reception circuit 45 are both acquired by the control circuit 20 and corrected by the control circuit 20 using a correction signal Sc. It may be possible that the control circuit 20 calculate the absolute positions of the vehicle A and the mobile terminal 110 with high accuracy based on the use of the corrected GNSS signals Sg. Accordingly, it may be possible for the on-vehicle device 10 to perform highly accurate detection of a relative positional relationship between the vehicle A and the terminal possessor B who may be located in a position not directly visible from the vehicle A by using the vehicle position information and the terminal position information that are calculated by the on-vehicle device 10.

Additionally, in the first embodiment, the on-vehicle device 10 mounted in the vehicle A corrects the GNSS signal reception circuit 45 of the mobile terminal, which is transmitted from the mobile terminal 110, by using the correction signal Sc before calculating the terminal position information. Then, the on-vehicle device 10 transmits the vehicle position information, together with the corrected terminal position information, so that the information is received by the mobile terminal 110. As a result, the mobile terminal 110 enables highly accurate detection of a positional relationship of the vehicle A with respect to the target person to be notified who may be located in a position not directly visible from the vehicle A by using the vehicle position information and the terminal position information that are acquired from the on-vehicle device 10.

As described above, it may be possible that the on-vehicle device 10 and the mobile terminal 110 provide alerts to the driver and the terminal possessor B at appropriate timings, respectively, for the proximity of the vehicle A and the terminal possessor B.

Additionally, in the first embodiment, information of the correction signal Sc is stored in the correction information storage portion 34. Hence, even when a correction signal Sc is unavailable for reception due to factors related to the environment of the vehicle A, it may be possible for the vehicle position calculation portion 31 to still correct GNSS signals Sg of the vehicle and the mobile terminal by using the stored information of the correction signal Sc. Hence, it may be possible for the vehicle position calculation portion 31 maintain the accuracy of the absolute positions of the on-vehicle device 10 and the mobile terminal 110 and, consequently, the accuracy of a positional relationship of the mobile terminal 110 with respect to the vehicle A in situations where a correction signal Sc may be unlikely to be received.

Additionally, the correction information storage portion 34 according to the first embodiment can retain the correction signal Sc in the form of tendency data, not necessarily in the form of raw data. It may be possible to simplify the GNSS signal correction process with use of such tendency data. As a result, it may be possible to secure a real-time positional relationship, which is calculated, between the vehicle A and the terminal possessor B without excessive enhancement of the throughput of the processor 21. Hence, it may be possible that the on-vehicle device 10 and the mobile terminal 110 provide alerts at more appropriate timings.

Additionally, in the first embodiment, a piece of information of the correction signal Sc that corresponds to a different area is stored in the correction information storage portion 34. Hence, when the vehicle has moved to the different area while a correction signal Sc is unavailable for reception, it may be possible for the vehicle position calculation portion 31 to correct the GNSS signals Sg of the vehicle and the mobile terminal by using the piece of information of the correction signal Sc stored in the correction information storage portion 34. As described above, the accuracy of the absolute positions of the vehicle A and the mobile terminal 110 and, consequently, the accuracy of a positional relationship of the mobile terminal 110 with respect to the vehicle A can be maintained at higher levels even in an area having an insufficient environment for the mobile communication, as long as the correction signal Sc is available for reception by the on-vehicle device 10 before the vehicle A has moved to the area.

Furthermore, in the first embodiment, a piece of information of the correction signal Sc that corresponds to an area to which the vehicle A is planned to move, a piece of information of the correction signal Sc that corresponds to an adjacent area, or the like can be acquired in advance. Storing selected pieces of information of the correction signal Sc that are highly likely to be used in the correction information storage portion 34 as described above enables a decrease in the storage capacity of the flash memory 23 and a reduction in communication load on the mobile communication.

Moreover, the frequency with which the mobile terminal 110 according to the first embodiment detects the terminal position information based on the GNSS signal Sg is reduced to be lower than the frequency with which the mobile terminal 110 transmits the GNSS signal Sg. Hence, the actual position of the terminal possessor B at a certain point in time may be shifted from the position of the terminal possessor B recognized by the on-vehicle device 10. It may be possible that the vehicle position calculation portion 31 correct the terminal position information by using the moving direction and the moving speed of the mobile terminal 110 to compensate for the shift of the terminal possessor B and thereby estimate the current position of the mobile terminal 110. As a result, it may be possible for the vehicle position calculation portion 31 to obtain the current absolute position of the mobile terminal 110 with higher accuracy.

Note that the terminal possessor B corresponds to a target person to be notified, the on-vehicle device 10 corresponds to a position detection apparatus, the vehicle position calculation portion 31 corresponds to a corrected-position calculation portion, and the correction information storage portion 34 corresponds to an information storage portion. The wireless communication circuit 41 corresponds to a terminal position communicator, the mobile communication circuit 43 corresponds to a correction signal receiver, the GNSS signal reception circuit 45 corresponds to a satellite signal receiver, and the GNSS signal Sg corresponds to a positioning signal. S162 corresponds to a transmission step. S163 corresponds to a reception step. S165 corresponds to a corrected-position calculation step.

Second Embodiment

Figure 10:
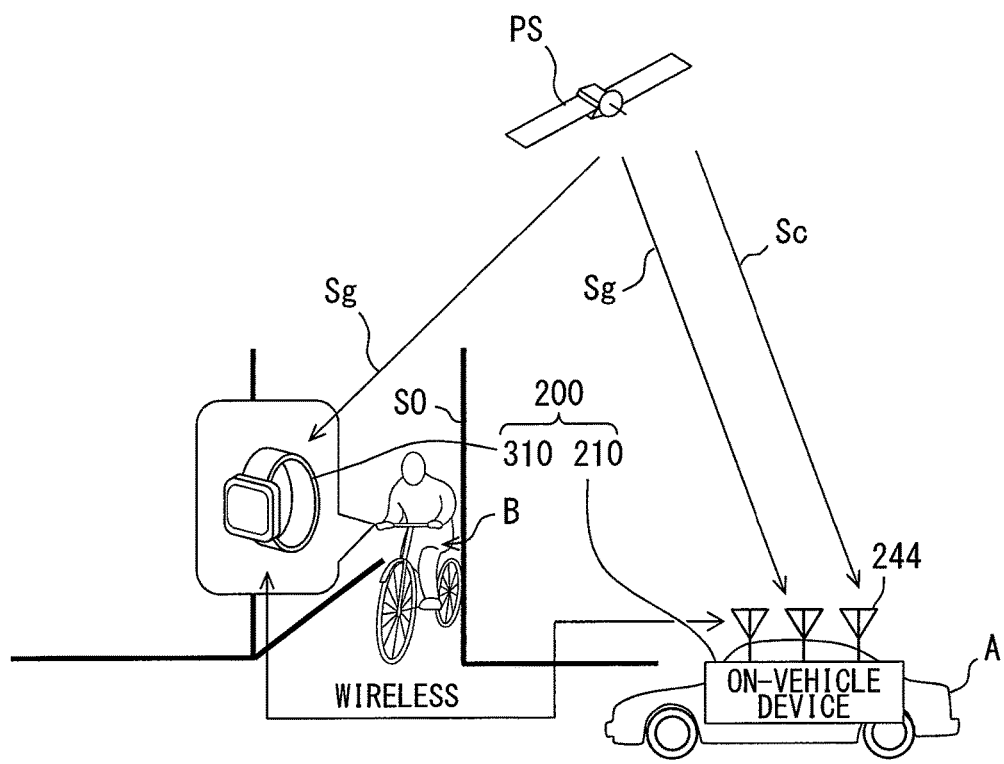
FIG. 10 is a diagram schematically illustrating a broad view of a position detection system according to a second embodiment.
Figure 11:
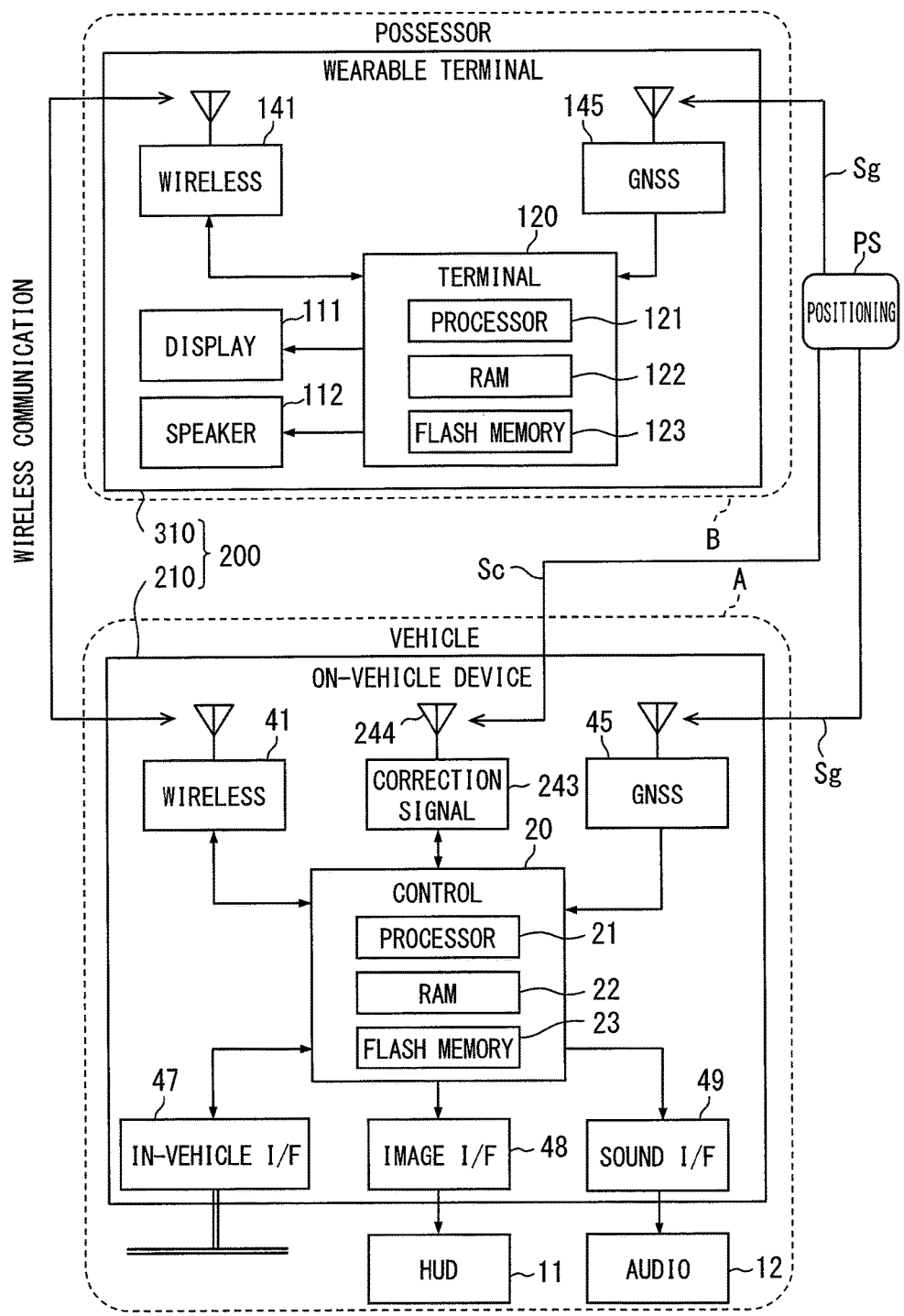
FIG. 11 is a block diagram illustrating a configuration of the position detection system according to the second embodiment.

A second embodiment of the present disclosure illustrated in FIGS. 10 and 11 is a modification of the first embodiment.

In a position detection system 200 according to the second embodiment, an on-vehicle device 210 receives a correction signal Sc from a positioning satellite PS. A terminal possessor B possesses a wearable terminal 310, which is a communication apparatus, in place of the mobile terminal 110 (see FIG. 1).

The on-vehicle device 210 includes a correction signal reception circuit 243 in addition to a wireless communication circuit 41 and a GNSS signal reception circuit 45. The correction signal reception circuit 243 is connected to an antenna 244 that can transmit and receive an electric wave including a correction signal Sc. The correction signal reception circuit 243 can receive the correction signal Sc for correction of a detected position based on a GNSS signal Sg, as in the case with the mobile communication circuit 43 in the first embodiment. The correction signal Sc may be transmitted by a positioning satellite PS that transmits the GNSS signal Sg. Alternatively, the correction signal Sc may be transmitted by an artificial satellite that is different from the positioning satellite PS that transmits the GNSS signal Sg. The correction signal reception circuit 243 transfers the received correction signal Sc to a control circuit 20. The control circuit 20 corrects a GNSS signal Sg received by the on-vehicle device 210 and a GNSS signal Sg transmitted by the wearable terminal 310 by using information of the correction signal Sc acquired from the correction signal reception circuit 243.

The wearable terminal 310 is, for example, a wristwatch-type mobile terminal and is worn by the terminal possessor B on the wrist. The wearable terminal 310 enables a terminal notification application that achieves the function of the position detection system 200 to operate in a terminal circuit 120. The wearable terminal 310 includes the terminal circuit 120, a wireless communication circuit 141, a GNSS signal reception circuit 145, a display 111, and a speaker 112, as in the case with the mobile terminal according to the first embodiment. The wearable terminal 310 lacks the mobile communication circuit 143 and the antenna 144 for mobile communication (see FIG. 2).

The second embodiment described above produces effects similar to those of the first embodiment and thereby allows the on-vehicle device 210 and the wearable terminal 310 to obtain a relative positional relationship of each other highly accurately in situations where a blocking object SO may be present. Hence, alerts can be provided to the driver and the terminal possessor B at appropriate timings.

In the second embodiment, the on-vehicle device 210 corresponds to a position detection apparatus, the correction signal reception circuit 243 corresponds to a correction signal receiver, and the wearable terminal 310 corresponds to a mobile terminal.

Other Embodiments

While some embodiments of the present disclosure have been described, the present disclosure should not be construed as being limited to these embodiments and is applicable to various embodiments and combinations thereof within a scope not departing from the spirit of the present disclosure.

The functions served by the processors of the control circuit and the terminal circuit in the embodiments described above may be achieved by, for example, a dedicated integrated circuit. Alternatively, these functions can be served by hardware and software different from those described above or a combination thereof.

The on-vehicle device in the embodiments described above is a control unit mounted in a vehicle. Alternatively, a mobile terminal, a tablet terminal, or the like brought in the vehicle by, for example, a driver may serve as a control unit that corresponds to the on-vehicle device and interchange information with a mobile terminal on a target person to be notified. The communication apparatus carried by the terminal possessor may be, for example, a mobile music player, a mobile game machine, a tablet terminal, an eyewear-type wearable device, or the like.

In the embodiments described above, information is shared between the mobile terminal and the on-vehicle device by wireless communication in conformance with the WiFi standards. Alternatively, the mobile terminal and the on-vehicle device can interchange information with each other by using dedicated short range communications (DSRC) based on wireless LAN technology, Bluetooth (registered trademark), or the like.

The on-vehicle device in the embodiments described above returns to the mobile terminal both the vehicle position information and the terminal position information that are corrected. Alternatively, the on-vehicle device can return to the mobile terminal a relative distance between the vehicle and the terminal possessor calculated from the vehicle position information and the terminal position information.

In the position detection system in the embodiments described above, the on-vehicle device and the mobile terminal broadcast positions and other information without being paired with each other. Alternatively, the on-vehicle device and the mobile terminal can be paired with each other and perform a process to share their respective positions each other.

The on-vehicle device according to the embodiments described above includes the correction information storage portion and stores a piece of information of the correction signal for the current position, pieces of information of the correction signal for areas within an assumed moving range, or the like in the correction information storage portion, so that the accuracy with which the positions are detected can be maintained in situations where a correction signal may be unlikely to be received. Alternatively, the correction information storage portion may not be included in the on-vehicle device. Additionally, a mobile communication circuit and a correction signal reception circuit may be both included, together with their antennas, in the on-vehicle device to receive the correction signal.

The on-vehicle device in the embodiments described above can correct the terminal position information by using the information of the moving direction and the moving speed in addition to the correction signal. Alternatively, the on-vehicle device may exclude the correction based on the moving direction and the moving speed.

The GNSS signal Sg in the embodiments described above is a GPS signal or the like transmitted by, for example, a GPS satellite. Alternatively, a positioning signal in conformance with other standards, such as, for example, Galileo and GLONASS may be used as the GNSS signal Sg.

The GNSS signal reception circuits 45 and 145 may be also referred to as positioning signal receivers.

It is noted that a flowchart or the processing of the flowchart in the present application includes multiple steps (also referred to as sections), each of which is represented, for instance, as S101. Further, each step can be divided into several sub-steps while several steps can be combined into a single step.

While various embodiments, configurations, and aspects of a position detection apparatus, a position detection method, and a position detection system according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A position detection apparatus that is mounted in a vehicle and detects a relative position of a mobile terminal on a target person to be notified located in a vicinity of the vehicle by achieving wireless communication with the mobile terminal, the position detection apparatus comprising:
    a satellite signal receiver that receives a positioning signal transmitted from a positioning satellite;
    a correction signal receiver that receives a correction signal for correcting the positioning signal;
    a terminal position communicator that receives the positioning signal acquired by the mobile terminal from the mobile terminal via the wireless communication;
    a corrected-position calculation portion that corrects positioning signals received by the mobile terminal and the satellite signal receiver by using the correction signal and calculates a positional relationship of the mobile terminal with respect to the vehicle from vehicle position information and terminal position information that are based on the positioning signals that are corrected; and
    an information storage portion that stores information of the correction signal received by the correction signal receiver,
    wherein:
    the correction signal has different pieces of information for different pre-zoned areas;
    the information storage portion stores a piece of information of the correction signal that corresponds to a different area different from an area that the vehicle is currently located in;
    the corrected-position calculation portion corrects the positioning signals by using the information of the correction signal stored in the information storage portion when the correction signal is unavailable for reception by the correction signal receiver; and
    the corrected-position calculation portion corrects the positioning signals by using the piece of information of the correction signal that corresponds to the different area stored in the information storage portion when the correction signal is unavailable for reception in the different area.

2. The position detection apparatus according to claim 1, wherein:
    the positioning signal received by the terminal position communicator from the mobile terminal includes satellite information indicative of a position or a satellite number of the positioning satellite.

3. The position detection apparatus according to claim 1, wherein:
    the terminal position communicator transmits the terminal position information calculated by the corrected-position calculation portion to the mobile terminal.

4. The position detection apparatus according to claim 1, wherein:
    the terminal position communicator transmits the vehicle position information calculated by the corrected-position calculation portion to the mobile terminal.

5. The position detection apparatus according to claim 1, wherein:
    the information storage portion stores tendency data including a tendency, estimated from the correction signal, of shifts in position information based on the positioning signals; and
    the corrected-position calculation portion corrects the vehicle position information and the terminal position information by using the tendency data stored in the information storage portion when the correction signal is unavailable for reception by the correction signal receiver.

6. The position detection apparatus according to claim 1, wherein:
    the information storage portion stores a piece of information of the correction signal that corresponds to the different area that the vehicle is planned to move to; and
    the corrected-position calculation portion corrects the positioning signals by using the piece of information of the correction signal that corresponds to the different area stored in the information storage portion when the correction signal is unavailable for reception in the different area that the vehicle is planned to move to.

7. The position detection apparatus according to claim 1, wherein:
    the information storage portion stores a piece of information of the correction signal that corresponds to an adjacent area that is adjacent to an area that the vehicle is currently located in; and
    the corrected-position calculation portion corrects the positioning signals by using the piece of information of the correction signal that corresponds to the adjacent area stored in the information storage portion when the correction signal is unavailable for reception after the vehicle moves to the adjacent area.

8. The position detection apparatus according to claim 1, wherein:
    the terminal position communicator receives a moving direction and a moving speed of the mobile terminal in addition to the positioning signal; and
    the corrected-position calculation portion corrects the terminal position information by using the moving direction and the moving speed of the mobile terminal.

9. A position detection system, comprising:
    an on-vehicle device mounted in a vehicle; and
    a mobile terminal on a target person to be notified located in a vicinity of the vehicle, the position detection system enabling the on-vehicle device and the mobile terminal to share respective position information with each other via wireless communication,
    wherein:
    the mobile terminal receives a positioning signal transmitted by a positioning satellite and transmits the positioning signal as a terminal positioning signal to the on-vehicle device; and
    the on-vehicle device includes:
        a satellite signal receiver that receives the positioning signal from the positioning satellite as a vehicle positioning signal;
        a correction signal receiver that receives a correction signal for correcting positioning signals;
        a terminal position communicator that receives the terminal positioning signal transmitted by the mobile terminal via the wireless communication;

a corrected-position calculation portion that corrects the terminal positioning signal and the vehicle positioning signal by using the correction signal and calculates a positional relationship of the mobile terminal with respect to the vehicle from vehicle position information and terminal position information that are based on the positioning signals that are corrected; and an information storage portion that stores information of the correction signal received by the correction signal receiver, wherein:

the correction signal has different pieces of information for different pre-zoned areas;

the information storage portion stores a piece of information of the correction signal that corresponds to a different area different from an area that the vehicle is currently located in;

the corrected-position calculation portion corrects the positioning signals by using the information of the correction signal stored in the information storage portion when the correction signal is unavailable for reception by the correction signal receiver; and the corrected-position calculation portion corrects the positioning signals by using the piece of information of the correction signal that corresponds to the different area stored in the information storage portion when the correction signal is unavailable for reception in the different area.

* * * * *